United States Patent
He et al.

(10) Patent No.: US 9,826,363 B1
(45) Date of Patent: Nov. 21, 2017

(54) MOBILE MEDIA DELIVERY SYSTEM AND METHODS OF USING THE SAME

(71) Applicants: David Quan He, Johns Creek, GA (US); Ming Jiang, Alpharetta, GA (US)

(72) Inventors: David Quan He, Johns Creek, GA (US); Ming Jiang, Alpharetta, GA (US)

(*) Notice: Subject to any disclaimer, the term of this patent is extended or adjusted under 35 U.S.C. 154(b) by 0 days.

(21) Appl. No.: 15/644,818

(22) Filed: Jul. 9, 2017

(51) Int. Cl.
 H04W 4/00 (2009.01)
 H04L 29/08 (2006.01)
 H04W 4/02 (2009.01)

(52) U.S. Cl.
 CPC .............. *H04W 4/023* (2013.01); *H04L 67/18* (2013.01); *H04W 4/008* (2013.01)

(58) Field of Classification Search
 CPC .... H04N 19/16; H04N 19/172; H04N 19/117; H04L 67/34; H04L 67/26; H04L 67/18; H04W 36/0033; H04W 64/003; H04W 4/023; H04W 4/008; H01L 23/528; H04H 60/97
 See application file for complete search history.

(56) References Cited

U.S. PATENT DOCUMENTS

| | | | | |
|---|---|---|---|---|
| 2002/0032035 A1* | 3/2002 | Teshima | ............... | G06Q 30/02 455/456.3 |
| 2004/0192351 A1* | 9/2004 | Duncan | ............... | G06Q 30/02 455/456.3 |
| 2006/0111979 A1* | 5/2006 | Chu | .................. | A63F 13/12 705/14.5 |
| 2013/0013412 A1* | 1/2013 | Altman | ............... | G09F 21/04 705/14.61 |
| 2014/0006160 A1* | 1/2014 | McDevitt | ......... | G06Q 30/0259 705/14.57 |
| 2015/0254720 A1* | 9/2015 | Newberg | .......... | G06Q 30/0261 705/14.63 |
| 2015/0363830 A1* | 12/2015 | Abuelsaad | ....... | G06Q 30/0266 705/14.63 |

(Continued)

OTHER PUBLICATIONS

U.S. Appl. No. 15/644,820, entitled "Mobile Media Delivery System and Methods of Using the Same", filed Jul. 9, 2017, David Quan He, and Ming Jiang.

(Continued)

*Primary Examiner* — Nizar Sivji
(74) *Attorney, Agent, or Firm* — Ming Jiang

(57) ABSTRACT

Present disclosure relates to a mobile media delivery platform. In certain embodiments, mobile media delivery platform includes one or more mobile media delivery systems and a mobile media delivery server (MMDS). Each mobile media delivery system is mounted on a vehicle and includes a mobile communication device (MCD), a mobile media delivery controller (MMDC), and a mobile media delivery device (MMDD). The MCD sends GPS location information of the mobile media delivery systems to the MMDS, receives a set of digital media and delivery instructions from MMDS based on the GPS location information, sends set of digital media and delivery instructions received to MMDC, instructs the MMDC to store the set of digital media and delivery instructions received in a media storage, and send the set of digital media and delivery instructions to MMDD, and instructs MMDD, through MMDC, to deliver the set of digital media according to the delivery instructions.

18 Claims, 3 Drawing Sheets

(56) References Cited

U.S. PATENT DOCUMENTS

2016/0232572 A1* 8/2016 East ................. G06Q 50/30
2016/0371894 A1* 12/2016 Rai ................. G01C 21/3484

OTHER PUBLICATIONS

U.S. Appl. No. 15/657,196, entitled "Mobile Advertisement Systems and Methods of Using the Same", filed Jul. 23, 2017, by David Quan He, and Ming Jiang.
U.S. Appl. No. 15/702,701, entitled "In-Vehicle Advertisement Display Systems for Mobile Advertisement Systems", filed Sep. 12, 2017, by Ming Jiang, and David Quan He.

* cited by examiner

US 9,826,363 B1

MOBILE MEDIA DELIVERY SYSTEM AND METHODS OF USING THE SAME

FIELD

The present disclosure generally relates to digital media, and more particularly to a mobile media delivery system and methods of using the mobile media delivery system.

BACKGROUND

The conventional digital media display may be divided into three general areas: commercial, informational, and personal. Typical commercial information display includes advertisements. Such advertisements can be seen on billboards along the roadside, posters displayed in store front, or sometimes on automobiles. Most of these advertisements have fixed contents, and are displayed in fixed locations. Informational media display such as news flash, breaking news, political posters and traffic directional displays are mostly fixed in locations. Personal information display such as stickers displayed on automobiles can be moved around and fun. However, these stickers are permanently affixed on the surfaces of the automobiles, and their contents may not be changed. For example, people hesitate to put any political stickers on their automobiles, because it is very difficult to remove them after the campaign is over. On the other hand, when people want to display some temporary messages such as "Just Married", or "Happy Birthday Mom" have to use washable paint so that these personal information displays may be removed without causing damages to the automobiles. Therefore, conventional digital media display is limited by the fixed contents and/or fixed location.

Therefore, an unaddressed need exists in the art to address the aforementioned deficiencies and inadequacies.

SUMMARY

In one aspect, the present disclosure relates to a mobile media delivery platform. In certain embodiments, the mobile media delivery platform includes one or more mobile media delivery systems, and a mobile delivery server. Each of the one or more mobile media delivery systems is mounted in a vehicle and delivers a set of digital media according to a set of corresponding delivery instructions. The set of digital media and the set of corresponding delivery instructions are provided by the mobile delivery server. Each of the one or more mobile media delivery systems includes a mobile communication device, a mobile media delivery controller, and a mobile media delivery device. The mobile communication device sends GPS location information of the mobile media delivery system detected by a GPS module of the mobile communication device to a mobile media delivery server over a network, receives a set of digital media and corresponding delivery instructions from the mobile media delivery server based on the GPS location information of the mobile media delivery system sent, instructs the mobile media delivery controller to send the set of digital media and the corresponding delivery instructions to the mobile media delivery device, and instructs the mobile media delivery device to deliver the set of digital media according to the delivery instructions. The mobile media delivery controller provides the set of digital media and the corresponding delivery instructions to the mobile media delivery device. The mobile media delivery device delivers the set of digital media according to the delivery instructions. In certain embodiments, each of the delivery instructions corresponds to one of the set of digital media. Each of the delivery instructions includes: a first time period and a first location information. The mobile media delivery device delivers the set of digital media when the mobile media delivery system is positioned in the region specified by the first location information and during the first time period.

In certain embodiments, computer executable instructions in a firmware cause a processor to: retrieve a set of local digital media and its corresponding local delivery instructions through the USB interface when the set of local digital media and the corresponding local delivery instructions are available, store the set of local digital media and the corresponding local delivery instructions retrieved in the media storage, and deliver the set of local digital media stored in the media storage through the mobile media delivery device according to the corresponding local delivery instructions. In certain embodiments, each of the local delivery instructions corresponds to one of the set of local digital media. Each of the local delivery instructions includes: a second time period and a second location information. The mobile media delivery device delivers the set of local digital media when the mobile media delivery system is positioned in the region specified by the second location information and during the second time period. The set of local digital media stored in the media storage may include: one or more banners, one or more digital images, one or more messages in text form, one or more animations, and one or more videos.

In another aspect, the present disclosure relates to a method of using a mobile media delivery system. In certain embodiments, the method includes: powering, by a user, on the mobile media delivery system, establishing network communication between a mobile communication device and a mobile media delivery controller over a local network, and establishing network communication between the mobile media delivery controller and a mobile media delivery server over a network, sending, via the mobile communication device, GPS location information of the mobile media delivery system detected by a GPS module of the mobile communication device to the mobile media delivery server. The method also includes sending, by the mobile media delivery server, a set of digital media and corresponding delivery instructions to the mobile communication device over the network based on the GPS location information of the mobile media delivery system, receiving, by the mobile communication device, the set of digital media and the corresponding delivery instructions from the mobile media delivery server, and sending, by the mobile communication device, the set of digital media and the corresponding delivery instructions received to the mobile media delivery controller, and storing the set of digital media and the corresponding delivery instructions received in a media storage of the mobile media delivery controller. The method may also include: sending, by the mobile media delivery controller, the set of digital media and the corresponding delivery instructions to a mobile media delivery device, and delivering, by the mobile media delivery device, the set of digital media according to the delivery instructions.

In certain embodiments, the method may also include: receiving, by the mobile media delivery controller, certain local digital media and certain local delivery instructions from a USB interface of the mobile media delivery controller when the set of local digital media and the corresponding local delivery instructions are available, storing, by the mobile media delivery controller, the set of local digital media and the corresponding local delivery instructions received in the media storage of the mobile media delivery controller, sending, by the mobile media delivery controller, the set of local digital media and the corresponding local delivery instructions stored in the media storage of the mobile media delivery controller to the mobile media delivery device, and delivering, by the mobile media delivery device, the set of local digital media according to the corresponding local delivery instructions.

In yet another aspect, the present disclosure relates to a non-transitory computer storage medium having computer-executable instructions stored in the non-transitory computer storage medium. When these computer-executable instructions are executed by a processor of a mobile communication device of a mobile media delivery system, the computer-executable instructions cause the processor to: check whether a mobile media delivery controller is powered on, and when the mobile media delivery controller is powered on, establish network communication between a mobile communication device and the mobile media delivery controller over a local network, and establish network communication between the mobile media delivery controller and a mobile media delivery server over a network, send GPS location information of the mobile media delivery system to the mobile media delivery server over the network, receive a set of digital media and corresponding delivery instructions from the mobile media delivery server based on the GPS location information of the mobile media delivery system sent by the mobile communication device, send the set of digital media and the corresponding delivery instructions received to the mobile media delivery controller, instruct the mobile media delivery controller to store the set of digital media and the corresponding delivery instructions received in a media storage of the mobile media delivery controller, instruct the mobile media delivery controller to send the set of digital media and the corresponding delivery instructions to a mobile media delivery device, and instruct the mobile media delivery device to deliver the set of digital media according to the delivery instructions.

In certain embodiments, the computer-executable instructions cause the processor to: instruct the mobile media delivery controller to receive certain local digital media and certain local delivery instructions from a USB interface of the mobile media delivery controller when the set of local digital media and the local delivery instruction are available, instruct the mobile media delivery controller to store the set of local digital media and the corresponding local delivery instructions received in the media storage, instruct the mobile media delivery controller to send the set of local digital media and the corresponding local delivery instructions to the mobile media delivery device, and instruct the mobile media delivery device to deliver the set of local digital media according to the corresponding local delivery instructions.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment. The drawings do not limit the present disclosure to the specific embodiments disclosed and described herein. The drawings are not necessarily to scale, emphasis instead being placed upon clearly illustrating the principles of the disclosure, and wherein.

DETAILED DESCRIPTION

Figure 1:
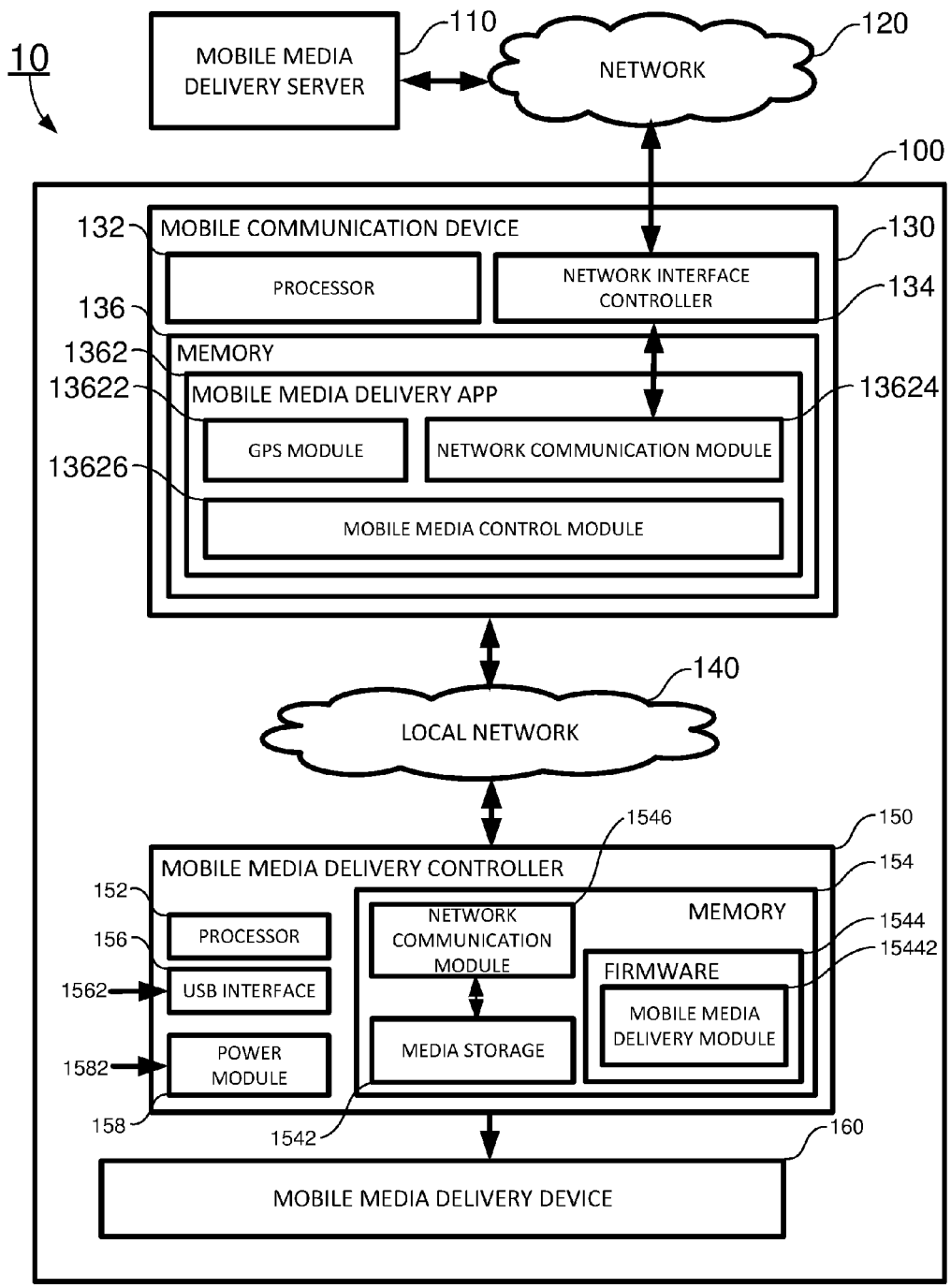
FIG. 1 schematically shows a block diagram of a mobile media delivery system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

The description will be made as to the embodiments of the present disclosure in conjunction with the accompanying drawings FIGS. 1 through 3.

Referring now to FIG. 1, in one aspect, the present disclosure relates to a mobile media delivery platform 10. In certain embodiments, the mobile media delivery platform 10 includes one or more mobile media delivery systems 100, and a mobile delivery server 110. Each of the one or more mobile media delivery systems is mounted in a vehicle to deliver a set of digital media according to a set of corresponding delivery instructions. The set of digital media and the set of corresponding delivery instructions are provided by the mobile media delivery server over a network 120. In certain embodiments, each of the mobile media delivery systems 100 includes a mobile communication device 130, a mobile media delivery controller 150, and a mobile media delivery device 160.

In certain embodiments, a mobile media delivery server 110 is connected to the mobile media delivery system 100 through the network 120. The network 120 may be a wireless network. The network 120 includes the internet, a wireless network, mobile communication network, Wi-Fi network, Zigbee personal area network, and Bluetooth network. The mobile media delivery server 110 manages all mobile media delivery system 100 connected to it and is a central location for a collection of any digital media to be delivered through the mobile media delivery system 100. When the mobile media delivery system 100 is powered up, the mobile media delivery system 100 establishes communication through the mobile communication device 130 with mobile media delivery server 110, and sends its GPS location information of the mobile media delivery system 100 to the mobile media delivery server 110, and then the mobile media delivery server 110 sends a set of digital media and corresponding delivery instructions in response to the mobile communication device 130 according to the GPS location information of the mobile media delivery system 100. In one embodiment, the mobile media delivery system 100 is operated as a mobile digital advertisement system, and the mobile media delivery server 110 provides all advertisements including location-based advertisements, advertisement delivery instructions for each of the advertisement dispatched, and receives feedback related to any accounting information of the advertisements from the mobile media delivery system 100.

In certain embodiments, the mobile communication device 130 is a bridge between the mobile media delivery system 100 and the mobile media delivery server 110. The mobile communication device 130 includes a processor 132, a network interface controller 134, and a memory 136. The memory 136 includes a mobile media delivery application 1362. The mobile media delivery application 1362 includes a GPS module 13622, a network communication module 13624, and a mobile media control module 13626. The GPS module 13622 detects the GPS location information of the mobile media delivery system 100. The network communication module 13624 establishes and maintains communication between the mobile media delivery application 1362 and the mobile media delivery server 110 through the network interface controller 134 and the network 120. The mobile media control module 13626 stores computer executable instructions, when these computer executable instructions are executed by the processor 132, these computer executable instructions cause the processor 132 to: detect the GPS location information of the mobile media delivery system 100 using the GPS module 13622, send the GPS location information of the mobile media delivery system 100 to the mobile media delivery server 110 over the network 120, receive a set of digital media and its corresponding delivery instructions in response according to the GPS location information of the mobile media delivery system 100 from the mobile media delivery server 110, and transmit the set of digital media and its corresponding delivery instructions received to the mobile media delivery controller 150.

In certain embodiments, the mobile media delivery controller 150 has a processor 152, a memory 154, and a power module 158. The power module 158 indicates the mobile media delivery system 100 is powered on when a power input 1582 is connected to and switched on to a power supply. The power input 1582 may include a regular 120V alternate current (AC) power supply, or a 12 V direct current (DC) power supply as often available on automobiles. The memory 154 includes a media storage 1542 for storing the set of digital media and the corresponding delivery instructions received from the mobile communication device 130, a network communication module 1546 for establishing communication between the mobile communication device 130 and the mobile media delivery device 160, and a firmware 1544 for storing computer executable instructions in a mobile media delivery module 15442. When these computer executable instructions are executed by the processor 152, the computer executable instructions cause the processor 152 to: receive the set of digital media and the corresponding delivery instructions from the mobile media delivery server 110 from the mobile communication device 130 through the network communication module 1546, store the set of digital media and the corresponding delivery instructions received in the media storage 1542, send the set of digital media and the corresponding delivery instructions to the mobile media delivery device 160 through the network communication module 1546, and instruct the mobile media delivery device 160 to deliver the set of digital media according to the delivery instructions through the network communication module 1546.

In certain embodiments, the transmission of the set of digital media and the corresponding delivery instructions to the mobile media delivery device 160 may include a local network 140. This local network 140 may include an HDMI cable, a RCA cable, a video cable, a Wi-Fi network, a Bluetooth network, and any other wired or wireless networks.

In certain embodiments, each of the delivery instructions corresponds to one of the set of digital media. Each of the delivery instructions includes: a first time period and a first location information. The mobile media delivery device 160 delivers the set of digital media when the mobile media delivery system 100 is positioned in the region specified by the first location information and during the first time period.

In certain embodiments, the computer executable instructions in the firmware 1544 cause the processor 152 to: send confirmation information back to the mobile media delivery server 110 after one or more of the set of digital media is delivered by the mobile media delivery device 160 through the mobile communication device 130 over the network 120. The confirmation information may include: the time of the delivery of each of the set of digital media, the location of the delivery of each of the set of digital media, and total time of the delivery of each of the set of digital media. In one embodiment, the mobile media delivery system 100 is a mobile advertisement system. The confirmation information may be used to account for the final results of the advertisements delivered so the mobile media delivery system 100 may use the confirmation information to charge the advertisers.

In certain embodiments, the set of digital media stored in the media storage 1542 include: one or more banners, one or more digital images, one or more messages in text form, one or more animations, one or more videos, and one or more amber alerts.

In certain embodiments, the mobile media delivery device 160 include: an image projector, a video projector, a laser image projector, a light-emitting diode (LED) display screen, an organic light-emitting diode (OLED) display screen, and a liquid crystal display (LCD) screen.

In certain embodiments, when the mobile media delivery system 100 is mounted on an automobile, the mobile media delivery device 160 may include an image projector, a video projector, a laser image projector. These projectors project images and videos on back window and/or side windows of the automobile. In certain embodiments, the projector may be mounted on either side or both sides of the rearview mirrors to project images and/or videos either or both side doors. In certain embodiments, the mobile media delivery device 160 may include an LED display screen and an LCD display screen mounted inside of the automobile, or embedded within the back window glass, or the side window glass. In certain embodiments, the mobile media delivery device 160 may include an OLED display screen. The OLED display screen may be mounted on the back window, side windows, the body of the automobile including the front and/or rear bumpers, the back door/trunk door, or anywhere on the body of the automobile.

Figure 2:
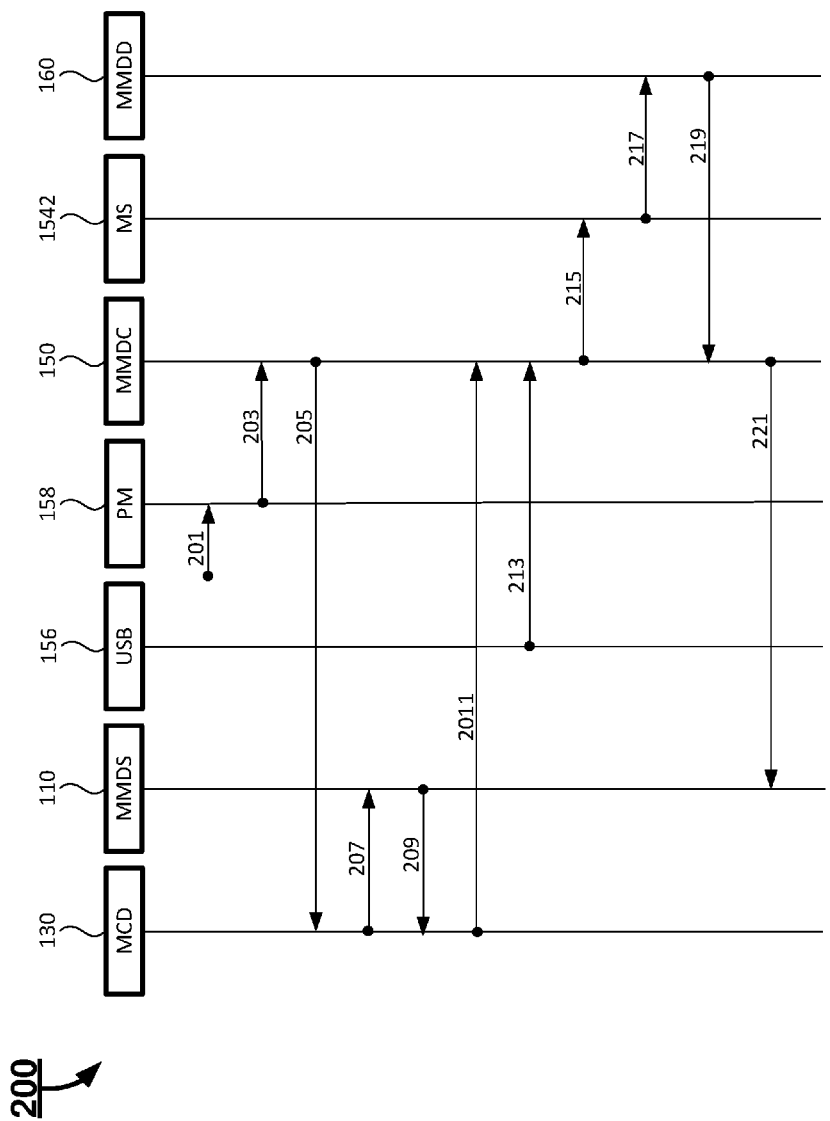
FIG. 2 shows a data flow chart of the mobile media delivery system according to certain embodiments of the present disclosure.

Referring now to FIG. 2, a data flow chart of the mobile media delivery system is shown according to certain embodiments of the present disclosure. The mobile media delivery system 100 includes: the power module (PM) 158, the mobile communication device (MCD) 130 having the GPS module (GPS) 13622, the mobile media delivery server (MMDS) 110, the USB interface (USB) 156, the media storage (MS) 1542, the mobile media delivery controller (MMDC) 150, and the mobile media delivery device (MMDD) 160.

In certain embodiments, a user turns on the power module 158 of the mobile media delivery controller 150 as shown as operation 201. For a mobile media delivery system 100 mounted on an automobile, the power module 158 may be connected to the power source of the automobile. When the user turns on the automobile, the power module 158 of the mobile media delivery system 100 is turned on as shown in operation 203.

At operation 205, the mobile media delivery controller 150 establishes communication with the mobile communication device 130 over a local network 140 and notifies the mobile media delivery controller 150 is on. At operation 207, the mobile communication device 130 establishes network communication with the mobile media delivery server 110 over the network 120, the GPS module 13622 detects the GPS location information of the mobile media delivery system 100, and sends the GPS location information of the mobile media delivery system 100 detected to the mobile media delivery server 110.

At operation 209, in response to the GPS location information of the mobile media delivery system 100 sent to the mobile media delivery server 110, the mobile media delivery server 110 sends a set of digital media and its corresponding delivery instructions to the mobile communication device 130 over the network 120. At operation 211, the mobile communication device 130 receives the set of digital media and the corresponding delivery instructions from the mobile media delivery server 110, and sends the set of digital media and the corresponding delivery instructions received to a mobile media delivery controller 150 over the local network 140. The mobile media delivery controller 150 receives the set of digital media and the corresponding delivery instructions and stores the set of digital media and the corresponding delivery instructions received in the media storage 1542 as shown in operation 215.

In certain embodiments, the set of digital media includes: one or more banners, one or more digital images, one or more messages in text form, one or more animations, one or more videos, and one or more amber alerts. Each of the delivery instructions includes: a first time period and a first location information. The mobile media delivery device 160 delivers the set of digital media when the mobile media delivery system 100 is positioned in the region specified by the first location information and during the first time period. Each of the local delivery instructions corresponds to one of the set of local digital media 1562.

In certain embodiments, the mobile media delivery system 100 may also include the USB interface (USB) 156 for retrieving a set of local digital media 1562 and its corresponding local delivery instructions. At operation 213, the mobile media delivery controller 150 checks if the set of local digital media 1562 and the corresponding delivery instructions are available through the USB interface 156. If they are available, the mobile media delivery controller 150 retrieves the set of local digital media 1562 and the corresponding local delivery instructions through the USB interface 156, and stores the set of local digital media 1562 and the corresponding local delivery instructions retrieved in the media storage 1542 as shown in operation 215.

In certain embodiments, the set of local digital media 1562 includes: one or more banners, one or more digital images, one or more messages in text form, one or more animations, and one or more videos. Each of the local delivery instructions includes: a second time period and a second location information. The mobile media delivery device 160 delivers the set of local digital media 1562 when the mobile media delivery system 100 is positioned in the region specified by the second location information and during the second time period. The set of local digital media 1562 stored in the media storage 1542 may include: one or more banners, one or more digital images, one or more messages in text form, one or more animations, and one or more videos.

At operation 217, the mobile media delivery controller 150 sends the set of digital media and the corresponding delivery instructions, and the set of local digital media 1562 and the corresponding local delivery instructions stored in the media storage 1542 to an output of the mobile media delivery controller 150 to the mobile media delivery device 160 and instructs the mobile media delivery device 160 to deliver the set of digital media according to the corresponding delivery instructions and deliver the set of local digital media according to the corresponding local delivery instructions, respectively. In certain embodiments, each of the delivery instructions corresponds to one of the set of digital media, and each of the local delivery instructions corresponds to one of the set of local digital media 1562.

At operation 219, the mobile media delivery device 160 sends confirmation information back to the mobile media delivery controller 150 after the set of digital media is delivered according to the corresponding delivery instructions.

At operation 221, the mobile media delivery controller 150 sends confirmation information back to the mobile media delivery server 110 after one or more of the set of digital media and/or one or more of the set of local digital media 1562 is delivered through the network communication module 1546 and the mobile communication device 130 over the network 120. The confirmation information includes: the time of the delivery of each of the set of digital media, the location of the delivery of each of the set of digital media, and total time of the delivery of each of the set of digital media. In one embodiment, the mobile media delivery system 100 is a mobile advertisement system. The confirmation information may be used to account for the final results of the advertisements delivered so the mobile media delivery system 100 may use the confirmation information to charge the advertisers.

Figure 3:
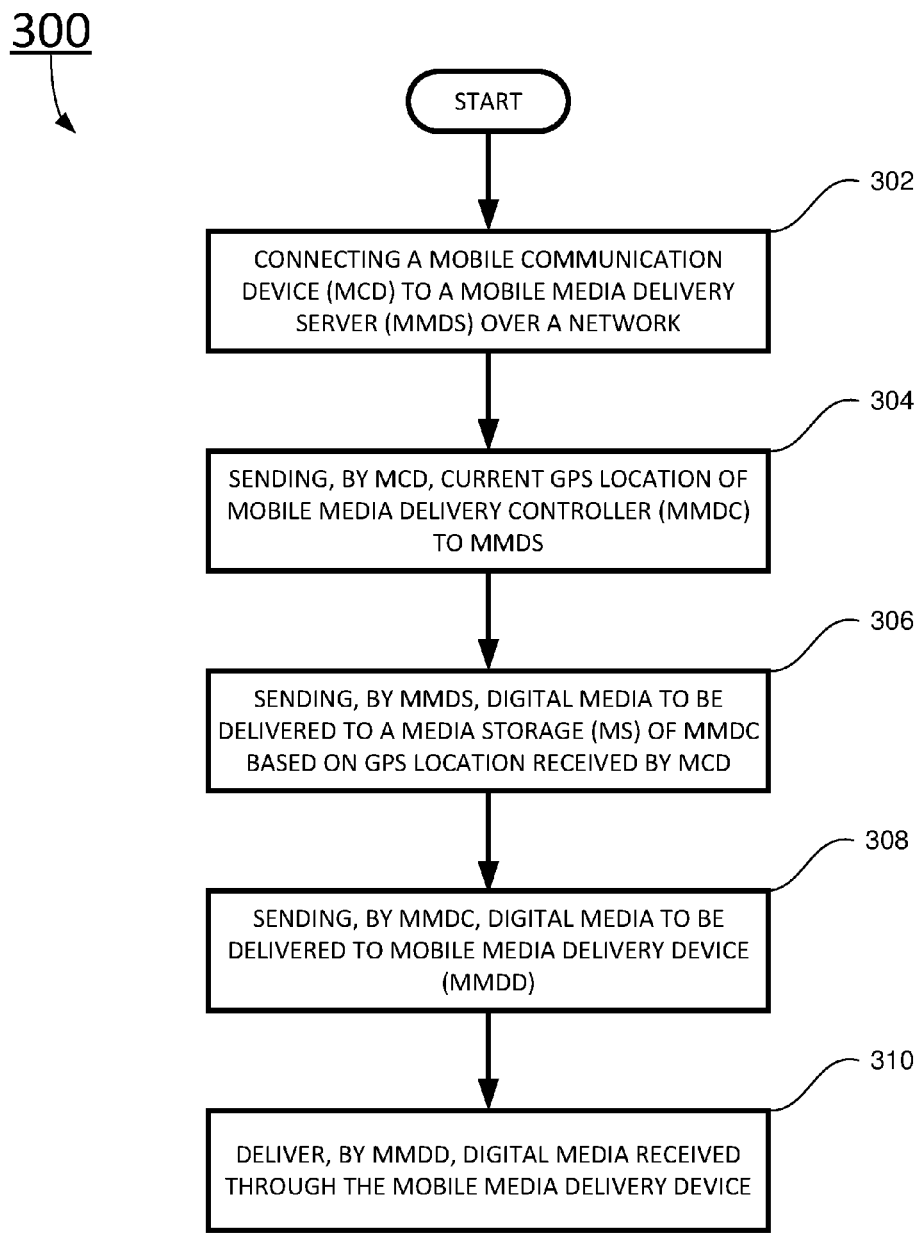
FIG. 3 shows a flow chart of a method of using the mobile media delivery system according to certain embodiments of the present disclosure.

Referring now to FIG. 3, in another aspect, the present disclosure relates to a method 300 of using the mobile media delivery system 100.

At block 302, after the user turns on the electric power of the mobile media delivery controller 150 through the power module 158 of the mobile media delivery controller 150, the mobile media delivery controller 150 establishes network communication with the mobile communication device 130 over the local network 140 and notifies the mobile communication device 130 that the mobile media delivery controller 150 is turned on and ready, and the mobile communication device 130 establishes network communication with the mobile media delivery server 110 over the network 120.

At block 304, once the network communication to the mobile media delivery server 110 over the network 120 is established, the GPS module 13622 of the mobile communication device 130 detects the GPS location information of the mobile media delivery system 100, and sends the GPS location information of the mobile media delivery system 100 to the mobile media delivery server 110 through the network 120.

At block 306, the mobile media delivery server 110 sends a set of digital media and its corresponding delivery instructions back to the mobile communication device 130 based on the GPS location information of the mobile media delivery system 100. The mobile communication device 130 then sends the set of digital media and the corresponding delivery instructions to the mobile media delivery controller 150 and have the set of digital media and the corresponding delivery instructions stored in the media storage 1542 of the mobile media delivery controller 150.

In certain embodiments, the mobile media delivery controller 150 checks if the set of local digital media 1562 and the set of corresponding local delivery instructions are available through the USB interface 156 of the mobile media delivery controller 150. If they are available, the mobile media delivery controller 150 retrieves the set of local digital media 1562 and the set of corresponding local delivery instructions through the USB interface 156, and stores the set of local digital media 1562 and the set of corresponding local delivery instructions retrieved in the media storage 1542.

At block 308, the mobile media delivery controller 150 retrieves the set of digital media and the corresponding delivery instructions from the media storage 1542 and sends the set of digital media and the corresponding delivery instructions retrieved to the mobile media delivery device 160 for delivery. In certain embodiments, the mobile media delivery controller 150 also retrieves a set of local digital media 1562 and its corresponding local delivery instructions from the USB interface 156 and stores the set of local digital media 1562 and the corresponding local delivery instructions in the media storage 1542 of the mobile media delivery controller 150.

In certain embodiments, the set of digital media includes: one or more banners, one or more digital images, one or more messages in text form, one or more animations, one or more videos, and one or more amber alerts. Each of the delivery instructions corresponds to one of the set of digital media. Each of the delivery instructions includes: a first time period and a first location information.

In certain embodiments, the set of local digital media 1562 includes: one or more banners, one or more digital images, one or more messages in text form, one or more animations, and one or more videos. Each of the local delivery instructions corresponds to one of the set of local digital media 1562. Each of the local delivery instructions includes: a second time period and a second location information.

At block 310, the mobile media delivery device 160 delivers the set of digital media according to the corresponding delivery instructions and the set of local digital media 1562 according to the corresponding local delivery instructions, respectively.

The mobile media delivery device 160 delivers the set of digital media when the mobile media delivery system 100 is positioned in the region specified by the first location information and during the first time period.

The mobile media delivery device 160 delivers the set of local digital media 1562 when the mobile media delivery system 100 is positioned in the region specified by the second location information and during the second time period.

In certain embodiments, the mobile media delivery controller 150 sends confirmation information back to the mobile media delivery server 110 after one or more of the set of digital media is delivered through the mobile communication device 130 over the network 120. The confirmation information includes: the time of the delivery of each of the set of digital media, the location of the delivery of each of the set of digital media, and total time of the delivery of each of the set of digital media.

In yet another aspect, the present disclosure relates to a non-transitory computer storage medium having computer-executable instructions stored in the non-transitory computer storage medium. When these computer-executable instructions are executed by a processor 132 of a mobile communication device 130 of a mobile media delivery system 100, the computer-executable instructions cause the processor to:

check whether a mobile media delivery controller 150 is powered on, when the mobile media delivery controller 150 is powered on, send GPS location information of the mobile media delivery system 100 to a mobile media delivery server 110 over a network 120;

receive a set of digital media and its corresponding delivery instructions from the mobile media delivery server 110 based on the GPS location information sent by the mobile communication device 130;

send the set of digital media and the corresponding delivery instructions received to the mobile media delivery controller 150;

instruct the mobile media delivery controller 150 to store the set of digital media and the corresponding delivery instructions received in a media storage 1542 of the mobile media delivery controller 150 and send the set of digital media and the corresponding delivery instructions to a mobile media delivery device 160; and instruct the mobile media delivery device 160 through a network communication module 1546 to deliver the set of digital media according to the delivery instructions and the set of local digital media 1562 according to the local delivery instructions by the mobile media delivery device 160, respectively. Each of the delivery instructions corresponds to one of the digital media. Each of the local delivery instructions corresponds to one of the local digital media. Each of the delivery instructions includes: a first time period and a first location information. Each of the local delivery instructions includes: a second time period and a second location information. The mobile media delivery device 160 delivers the set of digital media when the mobile media delivery system 100 is positioned in the region specified by the first location information and during the first time period. The mobile media delivery device 160 delivers the set of local digital media 1562 when the mobile media delivery system 100 is positioned in the region specified by the second location information and during the second time period.

In certain embodiments, the computer-executable instructions cause the processor to:

instruct the mobile media delivery controller 150 to retrieve a set of local digital media 1562 and its corresponding local delivery instructions from a USB interface 156 of the mobile media delivery controller 150 when the set of local digital media 1562 and the local delivery instruction are available;

instruct the mobile media delivery controller 150 to store the set of local digital media 1562 and the corresponding local delivery instructions retrieved in the media storage 1542 of the mobile media delivery controller 150, instruct the mobile media delivery controller 150 to send the set of local digital media 1562 and the corresponding local delivery instructions to the mobile media delivery device 160; and instruct the mobile media delivery device 160 to deliver the set of local digital media 1562 according to the local delivery instructions. Each of the local delivery instructions corresponds to one of the local digital media. Each of the local delivery instructions includes: a second time period and a second location information. The mobile media delivery device 160 delivers the set of local digital media 1562 when the mobile media delivery system 100 is positioned in the region specified by the second location information and during the second time period.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims, the foregoing description and the exemplary embodiments described therein, and accompanying drawings.

What is claimed is:

1. A mobile media delivery platform, comprising:
a plurality of mobile media delivery systems, wherein each of the plurality of mobile media delivery systems is mounted in a vehicle to deliver a plurality of digital media according to a plurality of delivery instructions; and
a mobile media delivery server for providing the plurality of digital media and the plurality of delivery instructions to the plurality of mobile media delivery systems over a network;
wherein each of the plurality of mobile media delivery systems comprises:
a mobile media delivery device for delivering the plurality of digital media according to the plurality of delivery instructions, wherein the plurality of digital media and the plurality of delivery instructions are received from a mobile media delivery controller through a mobile communication device from the mobile media delivery server remotely over the network;
a mobile media delivery controller for providing the plurality of digital media and the plurality of delivery instructions to the mobile media delivery device; and
a mobile communication device for sending Global Positioning System (GPS) location information of the mobile media delivery system detected by a GPS module of the mobile communication device to the mobile media delivery server over the network, receiving the plurality of digital media and the plurality of delivery instructions from the mobile media delivery server based on the GPS location information of the mobile media delivery system sent, instructing the mobile media delivery controller to send the plurality of digital media and the plurality of delivery instructions to the mobile media delivery device, instructing the mobile media delivery device through the mobile media delivery controller to deliver the plurality of digital media according to the plurality of delivery instructions, and instructing the mobile media delivery device to send confirmation information back to the mobile media delivery server via the mobile media delivery controller after one or more of the plurality of digital media is delivered by the mobile media delivery device through the mobile communication device over the network, wherein the confirmation information comprises: the time of the delivery of each of the plurality of digital media; the location of the delivery of each of the plurality of digital media; and total time of the delivery of each of the plurality of digital media.

2. The mobile media delivery system of claim 1, wherein the mobile communication device comprises a processor, and a mobile media delivery application having the GPS module and a mobile media control module, wherein the mobile media control module stores computer executable instructions, when executed by the processor, the computer executable instructions cause the processor to:
  check whether the mobile media delivery controller is powered on;
  when the mobile media delivery controller is powered on,
    send the GPS location information of the mobile media delivery system to the mobile media delivery server over the network;
    receive the plurality of digital media and the plurality of delivery instructions from the mobile media delivery server based on the GPS location information sent from the mobile media delivery server;
    send the plurality of digital media and the plurality of delivery instructions received to the mobile media delivery controller; and
    instruct the mobile media delivery device through the mobile media delivery controller to deliver the plurality of digital media according to the plurality of delivery instructions.

3. The mobile media delivery system of claim 1, wherein the mobile media delivery controller comprises a processor, a USB interface, and a memory having a media storage for storing the plurality of digital media and the plurality of delivery instructions, and a firmware having computer executable instructions, when executed by the processor, the computer executable instructions perform one or more of:
  receiving the plurality of digital media and the plurality of delivery instructions from the mobile media delivery server through the mobile communication device;
  storing the plurality of digital media and the plurality of delivery instructions received in the media storage;
  sending the plurality of digital media and the plurality of delivery instructions to the mobile media delivery device; and
  instructing the mobile media delivery device to deliver the plurality of digital media according to the plurality of delivery instructions.

4. The mobile media delivery system of claim 3, wherein each of the plurality of delivery instructions corresponds to one of the plurality of digital media, and each of the plurality of delivery instructions comprises: a first time period and a first location information, wherein the mobile media delivery device delivers the plurality of digital media when the mobile media delivery system is positioned in the region specified by the first location information and during the first time period.

5. The mobile media delivery system of claim 3, wherein the plurality of digital media stored in the media storage comprises:
  a plurality of banners;
  a plurality of digital images;
  a plurality of messages in text form;
  a plurality of animations;
  a plurality of videos; and
  one or more amber alerts.

6. The mobile media delivery system of claim 3, wherein when executed by the processor, the computer executable instructions in the firmware perform:
  retrieving a plurality of local digital media and a plurality of local delivery instructions through the USB interface when the plurality of local digital media and the plurality of local delivery instructions are available;
  storing the plurality of local digital media and the plurality of local delivery instructions retrieved in the media storage; and
  delivering the plurality of local digital media stored in the media storage through the mobile media delivery device according to the plurality of local delivery instructions.

7. The mobile media delivery system of claim 6, wherein each of the plurality of local delivery instructions corresponds to one of the plurality of local digital media, and each of the plurality of local delivery instructions comprises: a second time period and a second location information, wherein the mobile media delivery device delivers the plurality of local digital media when the mobile media delivery system is positioned in the region specified by the second location information and during the second time period.

8. The mobile media delivery system of claim 7, wherein the plurality of local digital media stored in the media storage comprises:
  a plurality of banners;
  a plurality of digital images;
  a plurality of messages in text form;
  a plurality of animations; and
  a plurality of videos.

9. The mobile media delivery system of claim 1, wherein the mobile media delivery device comprises:
  an image projector;
  a video projector;
  a laser image projector;
  a light-emitting diode (LED) display screen;
  an organic light-emitting diode (OLED) display screen; and
  a liquid crystal display (LCD) screen.

10. A method of using a mobile media delivery system, comprising:
  powering, by a user, on the mobile media delivery system;
  establishing, via a mobile communication device, network communication over a network between a mobile media delivery server and the mobile communication device, and establishing network communication over a local network between the mobile communication device and a mobile media delivery controller;
  sending, via the mobile communication device, GPS location information of the mobile media delivery system to the mobile media delivery server;

sending, by the mobile media delivery server, a plurality of digital media and a plurality of delivery instructions to the mobile communication device over the network;

receiving, by the mobile communication device, the plurality of digital media and the plurality of delivery instructions from the mobile media delivery server;

sending, by the mobile communication device, the plurality of digital media and the plurality of delivery instructions received to the mobile media delivery controller, and storing, by the mobile media delivery controller, the plurality of digital media and the plurality of delivery instructions received in a media storage of the mobile media delivery controller;

sending, by the mobile media delivery controller, the plurality of digital media and the plurality of delivery instructions to a mobile media delivery device;

delivering, by the mobile media delivery device, the plurality of digital media according to the plurality of delivery instructions; and sending, by the mobile media delivery device, confirmation information via the mobile media delivery controller back to the mobile media delivery server after one or more of the plurality of digital media is delivered by the mobile media delivery device through the mobile communication device over the network, wherein the confirmation information comprises: the time of the delivery of each of the plurality of digital media; the location of the delivery of each of the plurality of digital media; and total time of the delivery of each of the plurality of digital media.

11. The method of claim 10, wherein each of the plurality of delivery instructions corresponds to one of the plurality of digital media, and each of the plurality of delivery instructions comprises: a first time period and a first location information, wherein the mobile media delivery device delivers the plurality of digital media when the mobile media delivery system is positioned in the region specified by the first location information and during the first time period.

12. The method of claim 10, wherein the plurality of digital media stored in the media storage comprises:
a plurality of banners;
a plurality of digital images;
a plurality of messages in text form;
a plurality of animations;
a plurality of videos; and
one or more amber alerts.

13. The method of claim 10, further comprising:
retrieving, by the mobile media delivery controller, a plurality of local digital media and a plurality of local delivery instructions from a USB interface of the mobile media delivery controller when the plurality of local digital media and the plurality of local delivery instructions are available;
storing, by the mobile media delivery controller, the plurality of local digital media and the plurality of local delivery instructions retrieved in the media storage;
sending, by the mobile media delivery controller, the plurality of local digital media and the plurality of local delivery instructions stored in the media storage to the mobile media delivery device; and
delivering, by the mobile media delivery device, the plurality of local digital media according to the plurality of local delivery instructions.

14. The method of claim 13, wherein each of the plurality of local delivery instructions corresponds to one of the plurality of local digital media, and each of the plurality of local delivery instructions comprises: a second time period and a second location information, wherein the mobile media delivery device delivers the plurality of local digital media when the mobile media delivery system is positioned in the region specified by the second location information and during the second time period.

15. The method of claim 13, wherein the plurality of local digital media stored in the media storage comprises:
a plurality of banners;
a plurality of digital images;
a plurality of messages in text form;
a plurality of animations; and
a plurality of videos.

16. A non-transitory computer storage medium having computer-executable instructions stored thereon which, when executed by a processor of a mobile communication device of a mobile media delivery system, cause the processor to:
check whether a mobile media delivery controller is powered on;
when the mobile media delivery controller is powered on,
establish network communication between the mobile communication device and a mobile media delivery server over a network;
send GPS location information of the mobile media delivery system detected by a GPS module of the mobile communication device to the mobile media delivery server over the network;
receive a plurality of digital media and a plurality of delivery instructions from the mobile media delivery server based on the GPS location information of the mobile media delivery system sent by the mobile communication device;
send the plurality of digital media and the plurality of delivery instructions received to the mobile media delivery controller over a local network;
instruct the mobile media delivery controller to receive the plurality of digital media and the plurality of delivery instructions and to store the plurality of digital media and the plurality of delivery instructions received in a media storage of the mobile media delivery controller and instruct the mobile media delivery controller to send the plurality of digital media and the plurality of delivery instructions to a mobile media delivery device;
instruct the mobile media delivery device to deliver the plurality of digital media according to the plurality of delivery instructions; and
instructing the mobile media delivery device to send confirmation information back to the mobile media delivery server via the mobile media delivery controller after one or more of the plurality of digital media is delivered by the mobile media delivery device through the mobile communication device over the network,
wherein the confirmation information comprises: the time of the delivery of each of the plurality of digital media; the location of the delivery of each of the plurality of digital media; and total time of the delivery of each of the plurality of digital media, and each of the plurality of delivery instructions corresponds to one of the plurality of digital media, and each of the plurality of delivery instructions comprises: a first time period and a first location information, wherein the mobile media delivery device delivers the plurality of digital media when the mobile media delivery system is positioned in the region specified by the first location information and during the first time period.

17. The non-transitory computer storage medium of claim 16, wherein when executed by the processor of the mobile communication device, the computer-executable instructions cause the processor to:

instruct the mobile media delivery controller to retrieve a plurality of local digital media and a plurality of local delivery instructions from a USB interface of the mobile media delivery controller when the plurality of local digital media and the local delivery instruction are available;

instruct the mobile media delivery controller to store the plurality of local digital media and the plurality of local delivery instructions retrieved in the media storage;

instruct the mobile media delivery controller to send the plurality of local digital media and the plurality of local delivery instructions to the mobile media delivery device; and instruct the mobile media delivery device to deliver the plurality of local digital media according to the plurality of local delivery instructions, wherein each of the plurality of local delivery instructions corresponds to one of the plurality of local digital media, and each of the plurality of local delivery instructions comprises: a second time period and a second location information, wherein the mobile media delivery device delivers the plurality of local digital media when the mobile media delivery system is positioned in the region specified by the second location information and during the second time period.

18. The non-transitory computer storage medium of claim 16, wherein the mobile media delivery system comprises:

the mobile media delivery device for delivering the plurality of digital media according to the plurality of delivery instructions, wherein the plurality of digital media and the plurality of delivery instructions are received from the mobile media delivery controller through the mobile communication device from the mobile media delivery server remotely over the network;

the mobile media delivery controller for providing the plurality of digital media and the plurality of delivery instructions to the mobile media delivery device; and the mobile communication device for sending GPS location information of the mobile media delivery system detected by a GPS module of the mobile communication device to the mobile media delivery server over the network, receiving the plurality of digital media and the plurality of delivery instructions from the mobile media delivery server based on the GPS location information sent, sending the plurality of digital media and the plurality of delivery instructions received to the mobile media delivery controller, instructing the mobile media delivery controller to store the plurality of digital media and the plurality of delivery instructions received in the media storage of the mobile media delivery controller and send the plurality of digital media and the plurality of delivery instructions to the mobile media delivery device, instructing, through the mobile media delivery controller, the mobile media delivery device to deliver the plurality of digital media according to the plurality of delivery instructions, and instructing the mobile media delivery device to send the confirmation information back to the mobile media delivery server via the mobile media delivery controller after one or more of the plurality of digital media is delivered by the mobile media delivery device through the mobile communication device over the network.

* * * * *